(12) United States Patent
Muta et al.

(10) Patent No.: US 11,807,308 B2
(45) Date of Patent: Nov. 7, 2023

(54) VEHICLE FLOOR STRUCTURE

(71) Applicant: TOYOTA JIDOSHA KABUSHIKI KAISHA, Toyota (JP)

(72) Inventors: Masahiro Muta, Toyota (JP); Soshiro Murata, Toyota (JP); Ayaka Kagami, Inazawa (JP); Yasuhide Matsuo, Toyota (JP); Ken Atsuta, Nagoya (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 70 days.

(21) Appl. No.: 17/529,797

(22) Filed: Nov. 18, 2021

(65) Prior Publication Data

US 2022/0227428 A1 Jul. 21, 2022

(30) Foreign Application Priority Data

Jan. 21, 2021 (JP) ................. 2021-007951

(51) Int. Cl.
*B60P 1/43* (2006.01)
*B62D 25/20* (2006.01)
*B60P 1/64* (2006.01)

(52) U.S. Cl.
CPC .......... *B62D 25/2036* (2013.01); *B60P 1/431* (2013.01); *B62D 25/2054* (2013.01); *B60P 1/6409* (2013.01)

(58) Field of Classification Search
CPC ............... B62D 25/2036; B62D 25/2054; B62D 25/20; B60P 1/431; B60P 1/6409; A61G 3/061; A61G 3/067; B60R 3/007

USPC ................................ 296/193.07
See application file for complete search history.

(56) References Cited

U.S. PATENT DOCUMENTS

| | | | | | |
|---|---|---|---|---|---|
| 4,251,179 | A | * | 2/1981 | Thorley | B60R 3/02 105/430 |
| 5,380,144 | A | * | 1/1995 | Smith | A61G 3/061 14/71.3 |
| 5,439,342 | A | * | 8/1995 | Hall | B60P 1/44 280/166 |
| 5,941,027 | A | * | 8/1999 | Hallsten | E06B 3/485 52/246 |
| 6,602,041 | B2 | * | 8/2003 | Lewis | B60P 1/433 414/921 |
| 7,131,161 | B2 | * | 11/2006 | Lee | E01D 19/125 14/73.1 |
| 9,605,466 | B2 | * | 3/2017 | Wojdyla | E05F 1/14 |
| 9,789,922 | B2 | * | 10/2017 | Dosenbach | A61G 3/061 |

(Continued)

FOREIGN PATENT DOCUMENTS

| | | |
|---|---|---|
| JP | H08268344 A | 10/1996 |
| JP | H10316053 A | 12/1998 |

(Continued)

*Primary Examiner* — Pinel E Romain
(74) *Attorney, Agent, or Firm* — Dinsmore & Shohl LLP

(57) ABSTRACT

A vehicle floor structure includes a floor member that includes an opening that is open at an end corresponding to an entrance, the opening extending toward a vehicle cabin side, and a floor panel that is supported by the floor member to cover the opening and includes an open end at a position corresponding to the entrance. The floor panel is configured by sequentially arranging and integrating unit panels in a width direction with a direction parallel to the open end serving as a longitudinal direction of the unit panels.

7 Claims, 4 Drawing Sheets

(56) References Cited

U.S. PATENT DOCUMENTS

| | | | | |
|---|---|---|---|---|
| 10,667,966 B2* | 6/2020 | Bryant | ................... | A61G 3/062 |
| 11,235,817 B2* | 2/2022 | Higgins | ................. | B62D 33/02 |
| 2002/0081184 A1* | 6/2002 | Sternberg | ................ | B60P 1/431 |
| | | | | 414/537 |
| 2020/0406974 A1* | 12/2020 | Ikeda | ..................... | B62D 21/09 |
| 2021/0128372 A1* | 5/2021 | Jones | ..................... | B60J 5/0477 |
| 2021/0332539 A1* | 10/2021 | Lee | ....................... | E01D 19/125 |
| 2022/0409452 A1* | 12/2022 | Kotagi | .................. | A61G 3/061 |

FOREIGN PATENT DOCUMENTS

| | | |
|---|---|---|
| JP | H11229724 A | 8/1999 |
| JP | 2011131637 A | 7/2011 |

\* cited by examiner

VEHICLE FLOOR STRUCTURE

CROSS-REFERENCE TO RELATED APPLICATION

This application claims priority to Japanese Patent Application No. 2021-007951 filed on Jan. 21, 2021, incorporated herein by reference in its entirety.

BACKGROUND

1. Technical Field

The present disclosure relates to a vehicle floor structure, particularly the vehicle floor structure having an open end that is not supported by a support material.

2. Description of Related Art

Conventionally, various materials have been known as a floor material for a vehicle, and Japanese Unexamined Patent Application Publication No. 10-316053 (JP 10-316053 A) discloses, as a floor structure for a truck, a floor structure for which an extruded aluminum material is used. A rib and the like that extend along an extrusion direction is easily formed using the extruded aluminum material. According to JP 10-316053 A, providing the rib on a surface of the floor material effectively reduces a possibility of slippage on the floor material.

SUMMARY

Here, a vehicle is provided with a ramp for facilitating egress and ingress of a wheelchair and the like. Such a vehicle accommodates the ramp that can be folded out downward from an entrance of the vehicle. In this case, there is a demand to reduce a step between a base portion of the ramp and the floor when the ramp is folded out. Therefore, it is not desirable to dispose a support material that supports an end of the floor of the vehicle corresponding to the entrance from below, and the end of the floor of the vehicle may be set as an open end.

Therefore, it is necessary to examine strength at the open end regarding the floor material around the entrance.

A vehicle floor structure according to the present disclosure includes a floor member that includes an opening that is open at an end corresponding to an entrance, the opening extending toward a vehicle cabin side, and a floor panel that is supported by the floor member to cover the opening and includes an open end at a position corresponding to the entrance, in which the floor panel is configured by sequentially arranging and integrating unit panels in a width direction with a direction parallel to the open end serving as a longitudinal direction of the unit panels.

An insertion hook that faces downward may be provided on one side of a unit panel in the width direction and an open hook receiving port that faces upward may be provided on another side of the unit panel in the width direction. The insertion hook on another unit panel may be inserted into and engaged with the hook receiving port of one unit panel on the open end side to integrate the two adjacent unit panels.

Two open insertion hooks that face downward may be provided on one side of a unit panel in the width direction and two open hook receiving ports that face upward may be provided on another side of the unit panel in the width direction. The two insertion hooks on another unit panel may be inserted into and engaged with the two hook receiving ports of one unit panel on the open end side to integrate the two adjacent unit panels.

The unit panel may have a hollow plate shape that has a closed cross section, and include a rib extending in the longitudinal direction inside the unit panel and connecting a front surface and a back surface of the unit panel in the closed cross section.

The unit panel may be made of aluminum.

According to the present disclosure, since the unit panel is arranged in the direction parallel to the open end, it is easy to obtain sufficient strength.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings. The present disclosure is not limited to the embodiment described below.

Vehicle Configuration

Figure 1A:
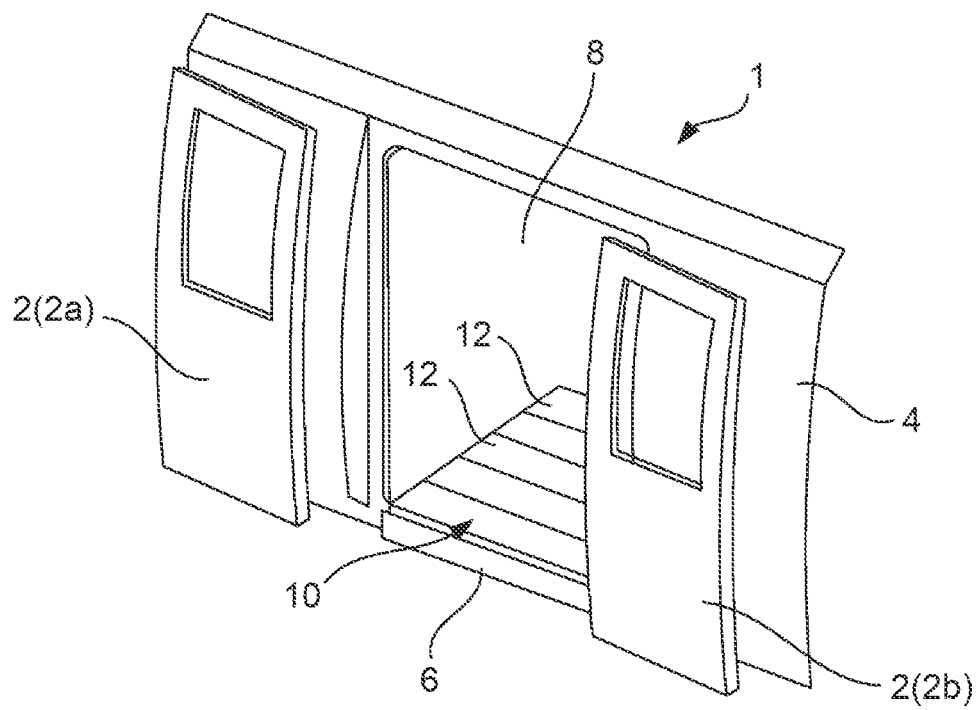
FIG. 1A is a perspective view showing a configuration of a surrounding area of an entrance of a vehicle 1.
Figure 1B:
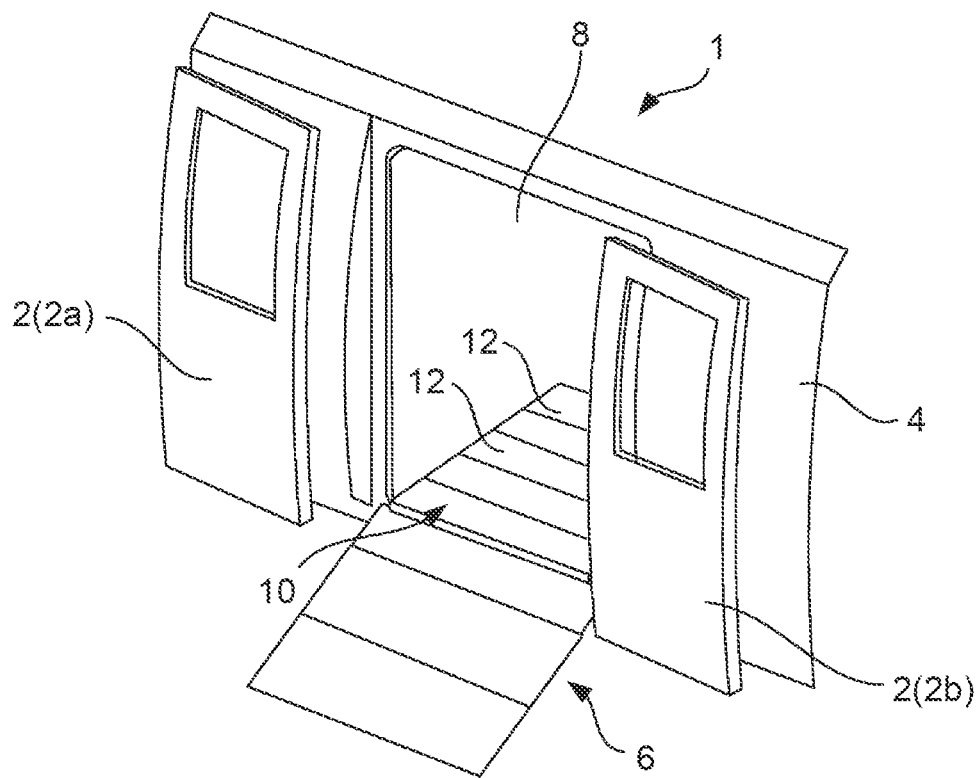
FIG. 1B is a perspective view showing the configuration of the surrounding area of the entrance of the vehicle 1, and showing a state in which a ramp is folded out.

FIGS. 1A and 1B are perspective views each showing a configuration of a surrounding area of an entrance of a vehicle 1. FIG. 1A shows a state in which a ramp is accommodated, and FIG. 1B shows a state in which the ramp is folded out. A vehicle body 4 includes a sliding door 2 on a left side surface of the vehicle body 4. The left side surface is one side surface of the vehicle body 4. Electric-powered ramp equipment 6 is provided under the sliding door 2 of the vehicle body 4.

The sliding door 2 includes two doors 2a and 2b (a front side is the door 2a and a rear side is the door 2b), and these doors 2a and 2b open and close an entrance 8 by sliding in opposite directions along a front-rear direction of the vehicle by a door opening/closing mechanism (not shown).

Further, in the electric-powered ramp equipment 6, the ramp is stored under a floor in normal times as shown in FIG. 1A, and when the ramp is used for egress and ingress, the ramp is folded out so as to protrude outward (diagonally to the left in FIG. 1B) as shown in FIG. 1B.

A floor panel 10 is disposed above a portion where the electric-powered ramp equipment 6 is disposed. The floor panel 10 is provided as a separate member from floor panels of other portions of the vehicle 1, and can be removed independently. As a result, for example, with the floor panel 10 removed, it is possible to perform operations such as inspection, repair and removal of the electric-powered ramp equipment 6 that is provided under the floor panel 10.

Floor Panel Attachment

Figure 2:
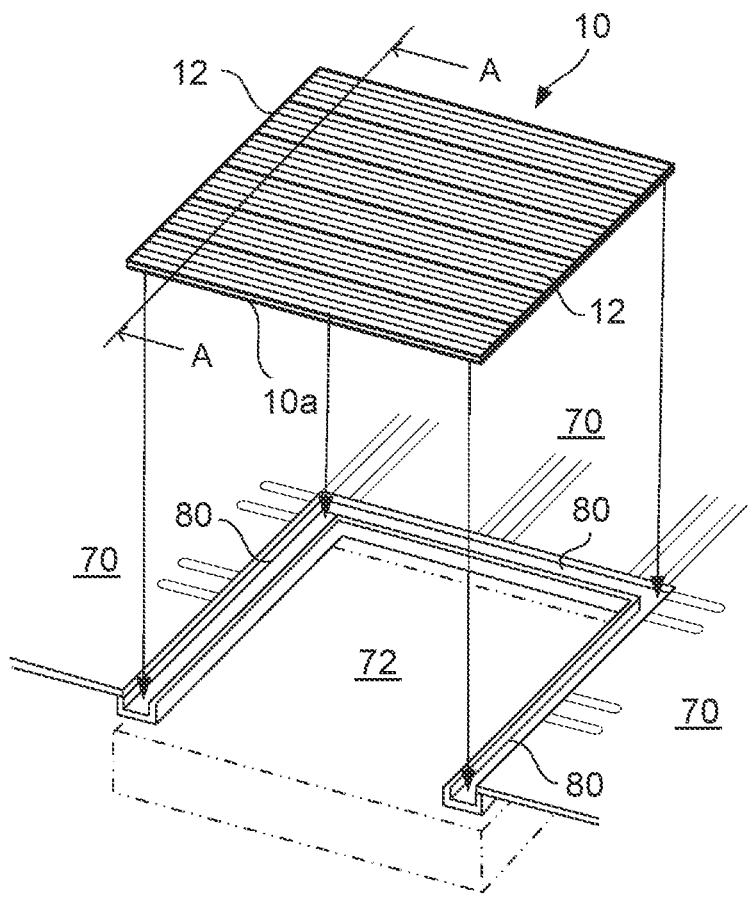
FIG. 2 is a diagram showing a structure for attaching a floor panel 10 to a vehicle.

FIG. 2 is a diagram showing a structure for attaching the floor panel 10 to the vehicle. A floor member 70 made of iron or the like is provided on the floor of the vehicle, and an opening 72 that is open at a position corresponding to the entrance on the side of the vehicle is provided in the floor member 70. A support portion 80 for supporting the floor panel 10 is provided on each of peripheral edge portions (three sides) of the opening 72, and each of peripheral edge portions (three sides) of the floor panel 10 is placed on the support portion 80 and tightened with appropriate fasteners such as bolts (not shown). Therefore, the floor panel 10 covers the opening 72, and the end of the floor panel 10 corresponding to the entrance is an open end 10a for which a support member such as the floor member 70 is not provided under the floor panel 10. Further, the floor panel 10 can be removed from the floor member 70 by removing the bolts and the like as necessary. An interior material such as a cover material may be installed as appropriate on the floor member 70 and the floor panel 10. The opening 72 is not necessarily in a square shape as long as it has the open end 10a.

The floor panel 10 is configured by sequentially arranging and integrating thin and long unit panels 12 in a width direction with a direction parallel to the open end 10a serving as its longitudinal direction.

Floor Panel Configuration

Figure 3:
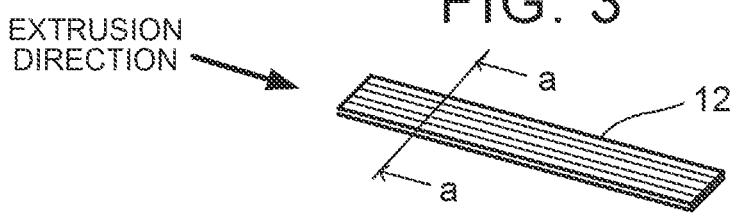
FIG. 3 is a perspective view showing a schematic configuration of a unit panel 12.

FIG. 3 is a perspective view showing a schematic configuration of a unit panel 12. The unit panel 12 is in a thin and long shape and has a hollow plate shape in which both ends in the longitudinal direction are open and that has a thin (the width is large than the thickness) quadrangular closed cross section. Further, the unit panel 12 includes ribs that extend in the longitudinal direction inside the unit panel 12 and connect a front surface and a back surface of the closed cross section. In this example, the unit panel 12 is formed by aluminum extrusion forming in which an aluminum material is extruded in an extrusion direction indicated by the arrow in FIG. 3. In the aluminum extrusion forming, the aluminum material is pressed toward a mold and extruded from the mold. Therefore, it is easy to form ribs and the like in the extrusion direction, and it is easy to increase strength against bending in the extrusion direction.

Figure 4:
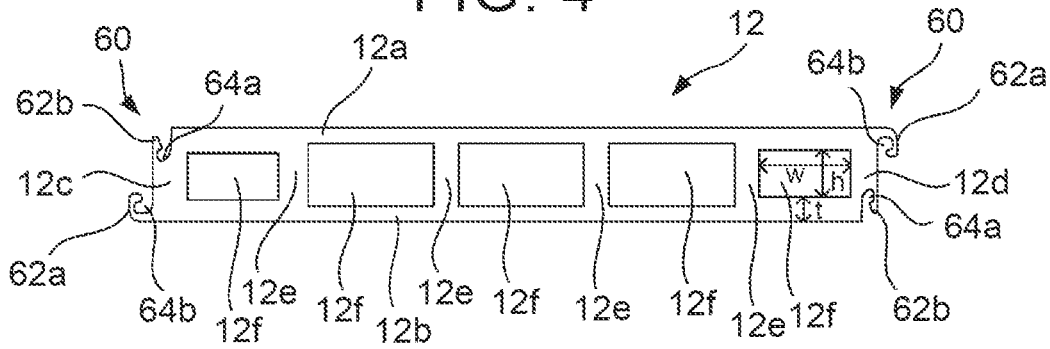
FIG. 4 is a cross-sectional view of an example of the unit panel 12 (a cross-sectional view of the unit panel 12 that is cut along line a-a of FIG. 3)

FIG. 4 is a cross-sectional view of an example of the unit panel 12 (a cross-sectional view of the unit panel 12 that is cut along line a-a of FIG. 3). The unit panel 12 has a quadrangular closed cross section including a front surface 12a and a back surface 12b, and both side surfaces 12c and 12d, and includes a plurality of ribs 12e for connecting the front surface 12a and the back surface 12b inside the unit panel 12. Therefore, the inner side of the unit panel 12 is divided into a plurality of chambers 12f by the ribs 12e. Each of the chambers 12f has a quadrangular cross section. A direction perpendicular to a surface of the drawing is the longitudinal direction (extrusion direction), and the same cross-sectional shapes are maintained in the longitudinal direction.

As described above, when the ribs 12e are provided, the strength in the longitudinal direction is increased, and when the inner side is divided into the relatively small chambers 12f in quadrangular shapes, the strength in the width direction is also relatively increased.

Here, as shown in FIG. 4, chambers 12f at both ends are smaller than the other chambers 12f. That is, a width w and a height h of each of the chambers 12f at both ends are smaller than those of the other chambers 12f. Therefore, a thickness t around each of the chambers 12f at both ends of the unit panel 12 is increased, so that the strength at this portion is increased. Therefore, when the unit panels 12 are connected, each of the unit panels 12 can sufficiently withstand a load applied from the adjacent unit panels 12.

Further, a connector portion 60 is provided on each of a side surface 12c and a side surface 12d of the unit panel 12 in the width direction. The connector portion 60 is composed of two insertion hooks 62a and 62b and hook receiving ports 64a and 64b corresponding to the insertion hooks 62a and 62b. That is, the hook receiving ports 64a and 64b are provided as notches on each of the side surfaces 12c and 12d of the unit panel 12, so that the insertion hooks 62a and 62b are provided as remaining portions, respectively. On the one side surface 12c, first, the hook receiving port 64a having a relatively small depth and facing upward and the insertion hook 62b having a relatively short length are provided at a position closer to an end, and then, the hook receiving port 64b having a relatively large depth and facing upward and the insertion hook 62a having a relatively longer length are provided at a position further from the end. On the other hand, on the other side surface 12d, the connector portion 60 is provided such that the orientation thereof is upside down from the connector portion 60 on the one side surface 12c. That is, first, the hook receiving port 64b having a relatively small depth and facing downward and the insertion hook 62a are provided, and then the hook receiving port 64a having a large depth and facing downward and the insertion hook 62b are provided.

Figure 5:
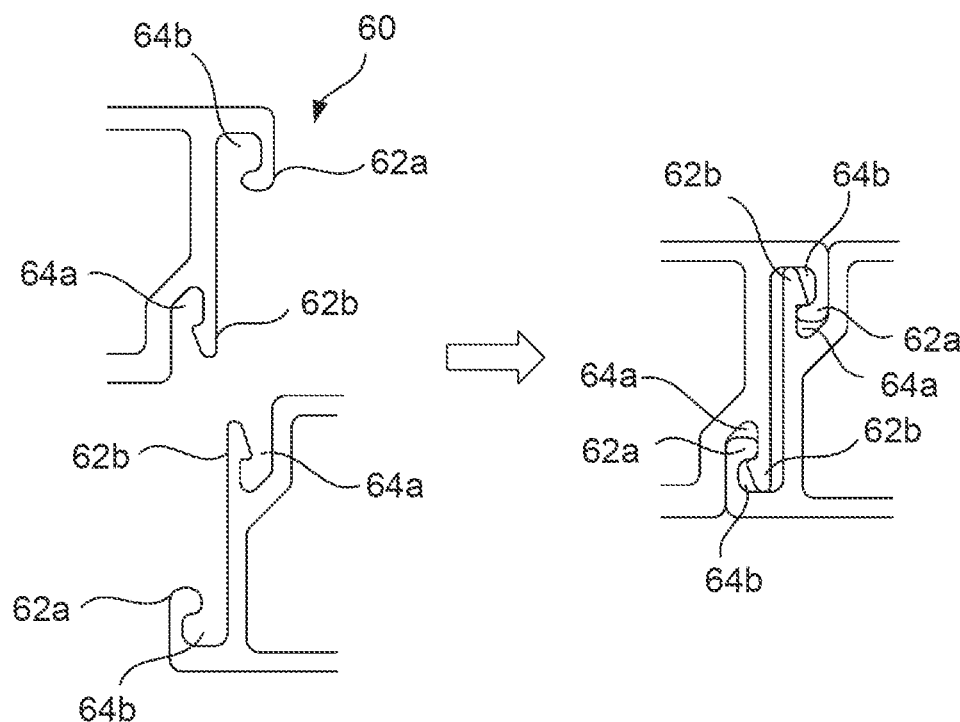
FIG. 5 is a diagram showing an engagement state of a connector portion 60 in which a left side shows a state before the connector portion 60 is engaged and a right side shows a state after the connector portion 60 is engaged.

FIG. 5 is a diagram showing an engagement state of the connector portion 60 in which a left side shows a state before the connector portion 60 is engaged and a right side shows a state after the connector portion 60 is engaged. As described above, the insertion hook 62 is inserted into the hook receiving port 64, and the insertion hook 62 and the hook receiving port 64 mesh and engage with each other.

Figure 6:
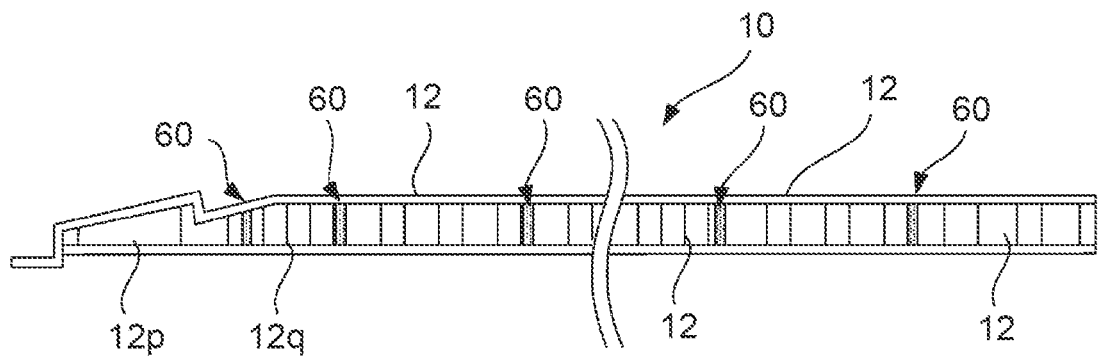
FIG. 6 is a cross-sectional view in a width direction showing a schematic configuration of the floor panel 10 provided by arranging a plurality of the unit panels 12 in the width direction and sequentially connecting the unit panels 12 (a cross-sectional view of the floor panel 10 that is cut along line A-A in FIG. 2)

FIG. 6 is a cross-sectional view in a width direction showing a schematic configuration of the floor panel 10 provided by arranging the unit panels 12 in the width direction and sequentially connecting the unit panels 12 (a cross-sectional view of the floor panel 10 that is cut along line A-A in FIG. 2). As described above, when the unit panels 12 are sequentially connected by the connector portion 60, it is possible to obtain the floor panel 10 having an appropriate width in the width direction.

Here, in this example, a shape of a leftmost unit panel 12p in the figure is different from those of the other unit panels 12. Since the unit panel 12p becomes the lowermost end when the ramp is folded out, and the tip of the unit panel 12p contacts the ground surface, the unit panel 12p is appropriately configured such that a smooth ramp is provided on the portion contacting the ground surface. The size of the second unit panel 12q from the left is also different.

Figure 7:
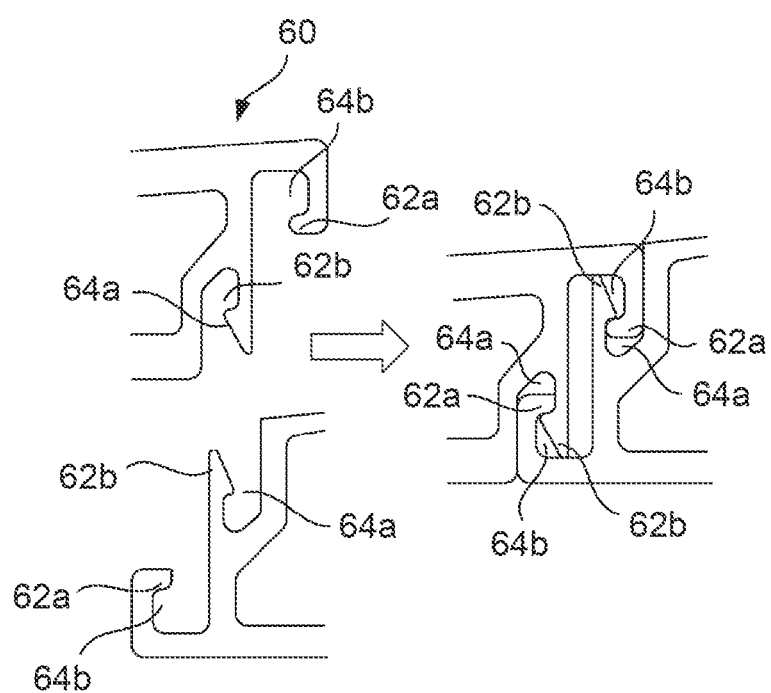
FIG. 7 is a diagram showing another configuration of a connector portion 60 that is a connecting portion between a unit panel 12 at the end and the adjacent unit panel 12.

FIG. 7 shows a configuration of the connector portion 60 that is a connecting portion between the leftmost unit panel 12*p* and the adjacent unit panel 12*q*. As described above, the upper surfaces of the two unit panels 12 are slightly inclined to provide a continuous ramp when the insertion hooks and the hook receiving ports are engaged.

What is claimed is:

1. A vehicle floor structure comprising:
   a floor member that includes an opening that is open at an end corresponding to an entrance, the opening extending toward a vehicle cabin side;
   a ramp disposed in the opening; and
   a floor panel disposed above the ramp that is separate and removable from the floor member and that is supported by the floor member to cover the opening and includes an open end at a position corresponding to the entrance, wherein the floor panel is configured by sequentially arranging and integrating unit panels in a width direction with a direction parallel to the open end serving as a longitudinal direction of the unit panels.

2. The vehicle floor structure according to claim 1, wherein:
   an insertion hook that faces downward is provided on one side of a unit panel in the width direction and an open hook receiving port that faces upward is provided on another side of the unit panel in the width direction; and
   the insertion hook on another unit panel is inserted into and engaged with the hook receiving port of one unit panel on the open end side to integrate two adjacent unit panels.

3. The vehicle floor structure according to claim 1, wherein:
   two open insertion hooks that face downward are provided on one side of a unit panel in the width direction and two open hook receiving ports that face upward are provided on another side of the unit panel in the width direction; and
   the two insertion hooks on another unit panel are inserted into and engaged with the two hook receiving ports of one unit panel on the open end side to integrate two adjacent unit panels.

4. The vehicle floor structure according to claim 1, wherein the unit panel has a hollow plate shape that has a closed cross section, and includes a rib extending in the longitudinal direction inside the unit panel and connecting a front surface and a back surface of the unit panel in the closed cross section.

5. The vehicle floor structure according to claim 1, wherein the unit panel is made of aluminum.

6. The vehicle floor structure according to claim 1, wherein the unit panel has a quadrangular closed cross section, and includes a front surface, a back surface, a first side surface, a second side surface, and a plurality of longitudinally extending ribs disposed between the first and second side surface and connecting the front surface and the back surface, the plurality of longitudinally extending ribs defining a plurality of chambers within the unit panel, wherein a chamber disposed adjacent the first side surface and a chamber disposed adjacent the second side surface have a width and a height smaller than a width and a height of a remaining plurality of chambers.

7. The vehicle floor structure according to claim 1, wherein at least one unit panel adjacent the open end of the floor panel includes a front surface that is at least partially inclined toward the vehicle cabin side.

* * * * *